United States Patent [19]

Chastain et al.

[11] Patent Number: 5,159,686

[45] Date of Patent: Oct. 27, 1992

[54] MULTI-PROCESSOR COMPUTER SYSTEM HAVING PROCESS-INDEPENDENT COMMUNICATION REGISTER ADDRESSING

[75] Inventors: David M. Chastain, Plano; James E. Mankovich, Garland; Gary B. Gostin, Coppell, all of Tex.

[73] Assignee: Convex Computer Corporation, Richardson, Tex.

[21] Appl. No.: 666,038

[22] Filed: Mar. 7, 1991

Related U.S. Application Data

[62] Division of Ser. No. 161,768, Feb. 29, 1988, Pat. No. 5,050,070.

[51] Int. Cl.⁵ .......................... G06F 15/16; G06F 9/38
[52] U.S. Cl. ............................. 395/650; 364/DIG. 1;
    364/230.3; 364/281.4
[58] Field of Search ... 364/200 MS File, 900 MS File;
    395/650

[56] References Cited

U.S. PATENT DOCUMENTS

| Re. 27,703 | 7/1973 | Stafford et al. | 364/200 |
|---|---|---|---|
| 3,106,698 | 10/1963 | Unger | 364/200 |
| 3,229,260 | 1/1966 | Falkoff | 364/200 |
| 3,337,854 | 8/1967 | Cray et al. | 364/200 |
| 3,346,851 | 10/1967 | Thorton et al. | 364/200 |
| 3,348,210 | 10/1967 | Ochsner | 364/200 |
| 3,374,465 | 3/1968 | Richmond et al. | 364/200 |
| 3,386,082 | 5/1968 | Stafford et al. | 364/200 |
| 3,440,611 | 4/1969 | Falkoff et al. | 364/200 |
| 3,480,914 | 11/1969 | Schlaeppi | 364/200 |
| 3,496,551 | 2/1970 | Driscoll | 364/200 |
| 3,541,516 | 11/1970 | Senzig | 364/200 |
| 3,560,934 | 6/1971 | Ernst et al. | 364/200 |
| 3,593,300 | 7/1971 | Driscoll, Jr. | 364/200 |
| 3,611,306 | 10/1971 | Reigel | 364/200 |
| 3,614,742 | 10/1971 | Watson et al. | 364/200 |
| 3,643,227 | 2/1972 | Smith et al. | 364/200 |
| 3,648,253 | 3/1972 | Mullery et al. | 364/200 |
| 3,810,119 | 5/1974 | Zieve et al. | 364/200 |
| 3,833,889 | 9/1974 | Cray | 364/200 |
| 3,876,987 | 4/1975 | Dalton et al. | 364/200 |
| 3,916,383 | 10/1975 | Malcolm | 364/200 |
| 4,034,347 | 7/1977 | Probert, Jr. | 364/200 |
| 4,073,005 | 2/1978 | Parkin | 364/200 |
| 4,123,795 | 10/1978 | Dean, Jr. et al. | 364/200 |
| 4,128,880 | 12/1978 | Cray, Jr. | 364/200 |
| 4,130,865 | 12/1978 | Heart et al. | 364/200 |
| 4,228,495 | 10/1980 | Benhard et al. | 364/200 |
| 4,229,790 | 10/1980 | Gilliland et al. | 364/200 |

(List continued on next page.)

OTHER PUBLICATIONS

P. Carnevali, et al., "Microtasking on IBM Multiprocessors", Aug. 1986, p. 42, Lines 21-25; p. 42, Line 35-p. 43, Line 8; p. 43, Lines 20-45.

Primary Examiner—Eddie P. Chan
Attorney, Agent, or Firm—Richards, Medlock & Andrews

[57] ABSTRACT

A computer system having a plurality of independent processors which can either execute a separate process for each processor, or execute parallel process operations across multiple processors for one process. The computer system includes a set of communication registers divided into a group of frames and a set of semaphores which correspond respectively to the registers. Typical processes have both serial and parallel code segments. During serial execution, a process is executed by a single processor, but when a parallelization instruction is encountered, which indicates that code can be executed in parallel, a semaphore is posted to invite other processors to join in parallel execution of the process. If any other processors in the system are idle, those processors detect the semaphore and accept a thread of process operation. Two or more processors may join in parallel operation if sufficient operations are available. However, if all processors are busy, then the processor conducting the serial operation will also execute all of the parallel operations. Thus, the processors are self-allocated, rather than being used on a demand or master-servant basis. This permits a greater throughput for the system because processors are not held idle when there is available process work to be done.

5 Claims, 4 Drawing Sheets

U.S. PATENT DOCUMENTS

| | | | |
|---|---|---|---|
| 4,288,496 | 10/1980 | Katzman et al. | 364/200 |
| 4,316,245 | 2/1982 | Luu et al. | 364/200 |
| 4,318,173 | 3/1982 | Freedman et al. | 364/200 |
| 4,318,174 | 3/1982 | Suzuki | 364/200 |
| 4,356,550 | 10/1982 | Katzman et al. | 364/200 |
| 4,365,295 | 12/1982 | Katzman et al. | 364/200 |
| 4,368,514 | 1/1983 | Persaud et al. | 364/200 |
| 4,394,727 | 7/1983 | Hoffman et al. | 364/200 |
| 4,394,730 | 7/1983 | Suzuki et al. | 364/200 |
| 4,402,045 | 8/1983 | Krol | 364/200 |
| 4,404,628 | 9/1983 | Angelo | 364/200 |
| 4,412,303 | 10/1983 | Barnes et al. | 364/900 |
| 4,445,197 | 4/1984 | Lorie et al. | 364/200 |
| 4,459,664 | 7/1984 | Pottier et al. | 364/200 |
| 4,462,075 | 7/1984 | Mori et al. | 364/200 |
| 4,481,580 | 11/1984 | Martin et al. | 364/200 |
| 4,482,956 | 11/1984 | Tallman | 364/200 |
| 4,484,264 | 11/1984 | Friedli et al. | 364/200 |
| 4,484,275 | 11/1984 | Katzman et al. | 364/200 |
| 4,494,188 | 1/1985 | Nakane et al. | 364/200 |
| 4,495,562 | 1/1985 | Yamaji et al. | 364/200 |
| 4,495,570 | 1/1985 | Kitajima et al. | 364/200 |
| 4,504,906 | 3/1985 | Itaya et al. | 364/200 |
| 4,507,726 | 3/1985 | Grinberg et al. | 364/200 |
| 4,514,807 | 4/1985 | Nogi | 364/200 |
| 4,530,051 | 7/1985 | Johnson et al. | 364/200 |
| 4,539,637 | 9/1985 | DeBruler | 364/200 |
| 4,543,626 | 9/1985 | Bean et al. | 364/200 |
| 4,543,627 | 9/1985 | Schwab | 364/200 |
| 4,569,017 | 2/1986 | Renner et al. | 364/200 |
| 4,589,063 | 5/1986 | Shah et al. | 364/200 |
| 4,590,555 | 5/1986 | Bourrez | 364/200 |
| 4,591,975 | 5/1986 | Wade et al. | 364/200 |
| 4,633,387 | 12/1986 | Hartung et al. | 364/200 |
| 4,633,389 | 12/1986 | Tanaka et al. | 364/200 |
| 4,633,472 | 12/1986 | Krol | 364/200 |
| 4,635,187 | 1/1987 | Baron et al. | 364/200 |
| 4,636,942 | 1/1987 | Chen et al. | 364/200 |
| 4,639,856 | 1/1987 | Hrustich et al. | 364/200 |
| 4,642,756 | 2/1987 | Sherrod | 364/200 |
| 4,646,230 | 2/1987 | Eguchi | 364/200 |
| 4,646,231 | 2/1987 | Green et al. | 364/200 |
| 4,654,779 | 3/1987 | Kato et al. | 364/200 |
| 4,658,351 | 4/1987 | Teng | 364/200 |
| 4,660,141 | 4/1987 | Ceccon et al. | 364/200 |
| 4,661,900 | 4/1987 | Chen | 364/200 |
| 4,663,708 | 5/1987 | Taub | 364/200 |
| 4,663,709 | 5/1987 | Fujiwara et al. | 364/200 |
| 4,672,535 | 6/1987 | Katzman et al. | 364/200 |
| 4,674,033 | 6/1987 | Miller | 364/200 |
| 4,674,036 | 6/1987 | Conforti | 364/200 |
| 4,683,531 | 7/1987 | Kelch et al. | 364/200 |
| 4,685,076 | 8/1987 | Yoshida | 364/736 |
| 4,691,280 | 9/1987 | Bennett | 364/200 |
| 4,692,860 | 9/1987 | Andersen | 364/200 |
| 4,704,680 | 11/1987 | Saxe | 364/200 |
| 4,829,425 | 5/1989 | Bain, Jr. et al. | 364/200 |
| 4,839,798 | 6/1989 | Eguchi et al. | 364/200 |

MULTI-PROCESSOR COMPUTER SYSTEM HAVING PROCESS-INDEPENDENT COMMUNICATION REGISTER ADDRESSING

This is a division of application Ser. No. 161,768, filed Feb. 29, 1988, now U.S. Pat. No. 5,050,070.

TECHNICAL FIELD

The present invention pertains in general to computer systems and in particular to such systems having a plurality of independent processors.

BACKGROUND OF THE INVENTION

The computational requirements in the scientific data processing field have increased to the point where it is difficult to build a single processor which has sufficient performance. This is due to limitations in the physical technology for building computers. One approach to solving this problem is the use of multiple processors for increasing data processing power for a system. However, many problems are encountered in attempting to use multiple processors. Multi-processor systems can simultaneously execute several unrelated processes (programs) and this has the effect of increasing system throughput. However, there is a need for a multi-processor system which is capable of accelerating the execution of a single process.

A number of systems have been described which have the goal of increasing the computational rate for a single process, but each of these systems suffer from one or more deficiencies. One example of such a system is described in U.S. Pat. No. 4,636,942 to Chen et al. This patent describes a system in which multiple processors share a set of common registers. These registers are divided into clusters, and the processors which are assigned to execute the same task are assigned access to a common cluster by the operating system. The cluster registers, together with a set of hardware semaphores, provides fast synchronization between the cooperating processors. This system has a number of drawbacks which tend to slow the performance of the system when used for parallel processing. When a process initiates parallel operations, the cluster allocation of registers must be performed by the operating system. This transfer of control from the executing process to the operating system and back is quite time consuming. After processor allocation, task synchronization between the processors is performed by a run-time library which must be embedded in the process code and requires substantial execution time to perform the task synchronization. Further, the invocation of multi-tasking for parallel execution of a process in Chen et al, is done explicitly by the programmer. Thus, parallelization is invoked only when previously selected by the programmer. Basically, the Chen et al approach utilizes a substantial time overhead to invoke multi-tasking within a process. As a result, the system described in the Chen et al patent can be efficiently used only if there are very large segments of parallelizable code within a process. This is termed "coarse granularity parallelism." The system described in Chen et al cannot be efficiently utilized to execute small granularity parallelism.

Another approach which has been proposed is to allocate processors to a task when the process is loaded for execution. By allocating processors in advance, the parallel segments of the process can be executed with reduced synchronization time. But, most processes have both serial and parallel code segments, and when a serial segment is being executed on one processor, the remaining allocated processors are idled. When the process is being executed in serial code, the remaining allocated processors are idled. Thus, in most practical applications, the approach of allocating processors in advance for parallel execution results in a loss of system throughput due to the idling of unneeded processors during serial execution.

In view of the need for increased processing speed for single processes and the difficulties which have been experienced in attempting to utilize multi-processors, there exists a need for a method and apparatus which can execute the parallel segments of a process with a low time overhead while not idling processors when a process is being executed in a serial segment.

SUMMARY OF THE INVENTION

A selected embodiment of the present invention is a multi-processor computer system for parallel execution of a process. The system includes a plurality of communication register sets, each of which comprises a plurality of communication registers. At least one semaphore register is provided for each communication register set. There is provided a process-independent communication index register associated with each of the processors for storing a first address segment, a communication index value, used for addressing one of the communication register sets. Logic circuitry is provided with each of the processors for producing second address segments which are derived from instructions in the process being executed. The second address segment serves to address one of the registers in each of the communication register sets. A bus interconnects the communication registers, the communication index registers and the processor logic circuitry and functions to convey addresses and data associated with the communication registers. An address mapping and checking circuit is connected to the bus and the communication registers and functions to combine the communication index value and the second address segment to produce a composite address used to address the selected communication register, and also checks the composite address for correctness. This system permits more than one of the processors to communicate with a selected one of the communication register sets by use of the composite address to detect if a semaphore has been set and to obtain process state data from the selected communication register for executing a parallel operation of the process in execution.

BRIEF DESCRIPTION OF THE DRAWINGS

For a more complete understanding the present invention and the advantages thereof, reference is now made to the following Description taken in conjunction with the accompanying Drawings in which.

DETAILED DESCRIPTION

Figure 1:
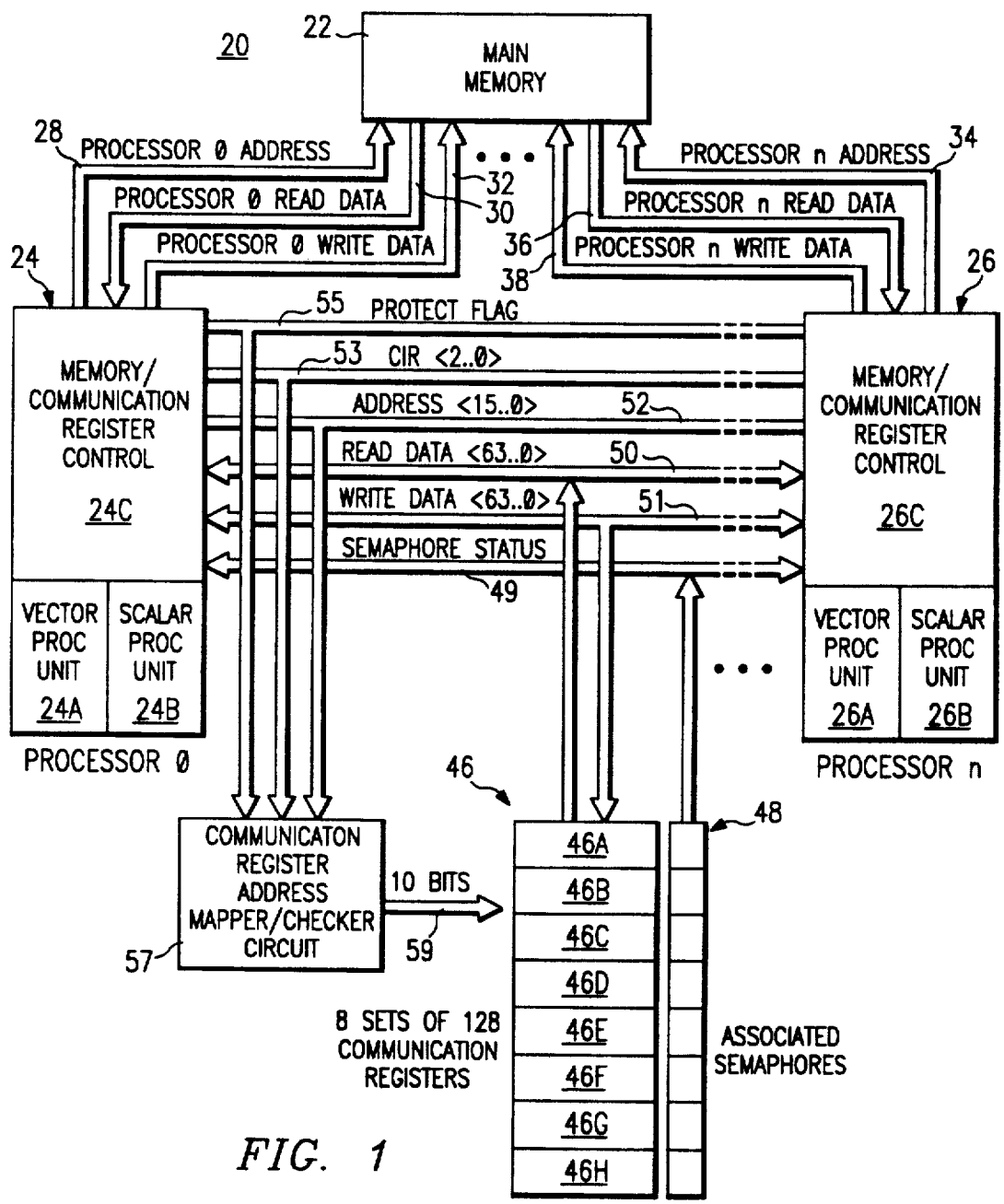
FIG. 1 is a block diagram of a multi-processor computer system in accordance with the present invention.

The purpose of the present invention is to obtain utilization of multi-processors to accelerate the performance of a single program, while retaining maximum performance of multiple simultaneous programs. In general, application programs have segments which can be executed only in a serial fashion by a single processor, principally due to data dependencies, and also has segments which can be executed in parallel by multiple processors. In order to efficiently utilize short segments of parallel operations it is essential that the overhead time required to initiate multi-processor operation be as little as possible. Only when this overhead is made sufficiently small can fine-granularity parallelism be exploited. Whenever a process in execution must stop and make an operating system call, there is a considerable loss of time. The present invention eliminates any need for calling the operating system to implement parallel operations.

To better understand the present invention, it is important to understand a program execution concept termed a "thread". A thread is a path of execution of the process (program). A purely sequential process has a single thread. If a process has a segment which can be executed in parallel by multiple processors, the process can then have multiple threads in existence during that time. The maximum number of threads which can exist at any point is sometimes referred to as the "logical" thread count. Since typical program execution transitions back and forth between serial and parallel segments, the logical thread count varies from segment to segment. But it is not required that each thread have a separate processor on which to execute. All logical threads can be executed sequentially on a single processor, as is normally done on a uni-processor. In the present invention, the operating system may restrict a given process as to the number of threads which it can execute in parallel. This limit can be described as the maximum "physical" thread count. If the physical thread count is less than the logical thread count for a given segment, it merely means that some logical threads will be executed sequentially, rather than in parallel. The maximum physical thread count for a process is a parameter which can be controlled by the operating system, through a parameter which is stored in a communication register set as a thread allocation mask.

The present invention provides a method and architecture which permits a single process with parallel segments to be executed either on a single processor or, for the parallel segments, by a plurality of processors if such processors are available. When a processor has completed execution of a thread of a process, and other threads of that process are still in progress, that processor is released so that it can execute other processes in the computer system. A very significant aspect of the present invention is that processors are "invited" to join in multiple processing rather than being demand allocated. A processor "accepts" the invitation if it is in an idle state and is therefore not executing any other process. This technique of non-demand allocation provides a very high level of utilization for all of the processors within a computer system and therefore provides a very high throughput for the overall system. A detailed description of the architecture and method of the present invention is described in the following FIGURES together with the listings presented in Appendices I and II.

Referring now to FIG. 1 there is shown a block diagram for a multi-processor computer system 20 in accordance with the present invention. The system 20 includes a main memory 22 and a plurality of processors such as 24 and 26. Processor 24 is labeled as the first processor in the system with the terminology PROCESSOR 0. The last processor in the group is termed PROCESSOR n. There may be any number of processors in the system 20, but a selected embodiment comprises a group of, for example, four processors.

Each of the processors includes a vector processing unit, 24A and 26A, as well as a scalar processing unit, 24B and 26B. Such vector and scalar processing units are described in detail in U.S. Pat. No. 4,620,275 to Wallach et al, which patent is incorporated herein by reference.

Each of the processors 24 and 26 further includes a memory/communication register control, 24C and 26C. These controls are described in further detail in FIG. 2.

Processor 24 communicates with the main memory 22 through an address bus 28, a read data bus 30 and a write data bus 32. The processor 26 communicates with the main memory 22 through an address bus 34, a read data bus 36 and a write data bus 38.

The system 20 further includes a group of communication registers 46 which are divided into eight frames 46A through 46H. Each frame can also be referred to as a set of communication registers. Each of the sets of communication registers or frames, such as 46A, comprises a plurality of registers. These are further described in reference to FIG. 3.

Associated with each set of communication registers is a semaphore used to signal a status associated with the data in that register set. These are shown as semaphores 48. These semaphores are implicitly manipulated by instructions which read and write the communication registers. Thus, a "send" instruction tests the semaphore of the target register, and if it is cleared, writes the data and sets the semaphore. Similarly, a "receive" instruction reads the register data, and clears the semaphore if it is set. Semaphore operations also return status on a semaphore status bus 49 which indicates the success or failure of the semaphore operation. This status is then available to the control sections of the processors, such as 24 and 26, such that appropriate response may be made.

The system 20 further includes a read data bus 50, a write data bus 51, and an address bus 52 for communication between the processors, such as 24 and 26 and communication registers 46. System 20 has a communication index register bus 53 and a protect flag bus 55, both of which are connected to the controls 24C and 26C. The control 24C of processor 24 is connected to transfer addresses from the control through the address buses 52 and register bus 53 to a communication register address mapper/checker circuit 57 for addressing through a line 59 any of the registers in the communication registers 46. The control 24C is further connected to read data bus 50 for reading data from the communication registers 46, and to write data bus 51 for writing data to the communication registers 46. The control 24C can further set and clear each of the semaphores 48 associated with the communication registers 46. The control 26C communicates in a similar fashion through the buses 49, 50, 51, 52, 53 and 55 with the communication registers 46 and semaphores 48.

A protect flag bus 55 is connected to the controls 24C and 26C to provide protection status of the controlling processor to a communication register address mapper/checker circuit 57. This circuit 57 can then detect addresses which are generated in error by user programs.

Figure 3:
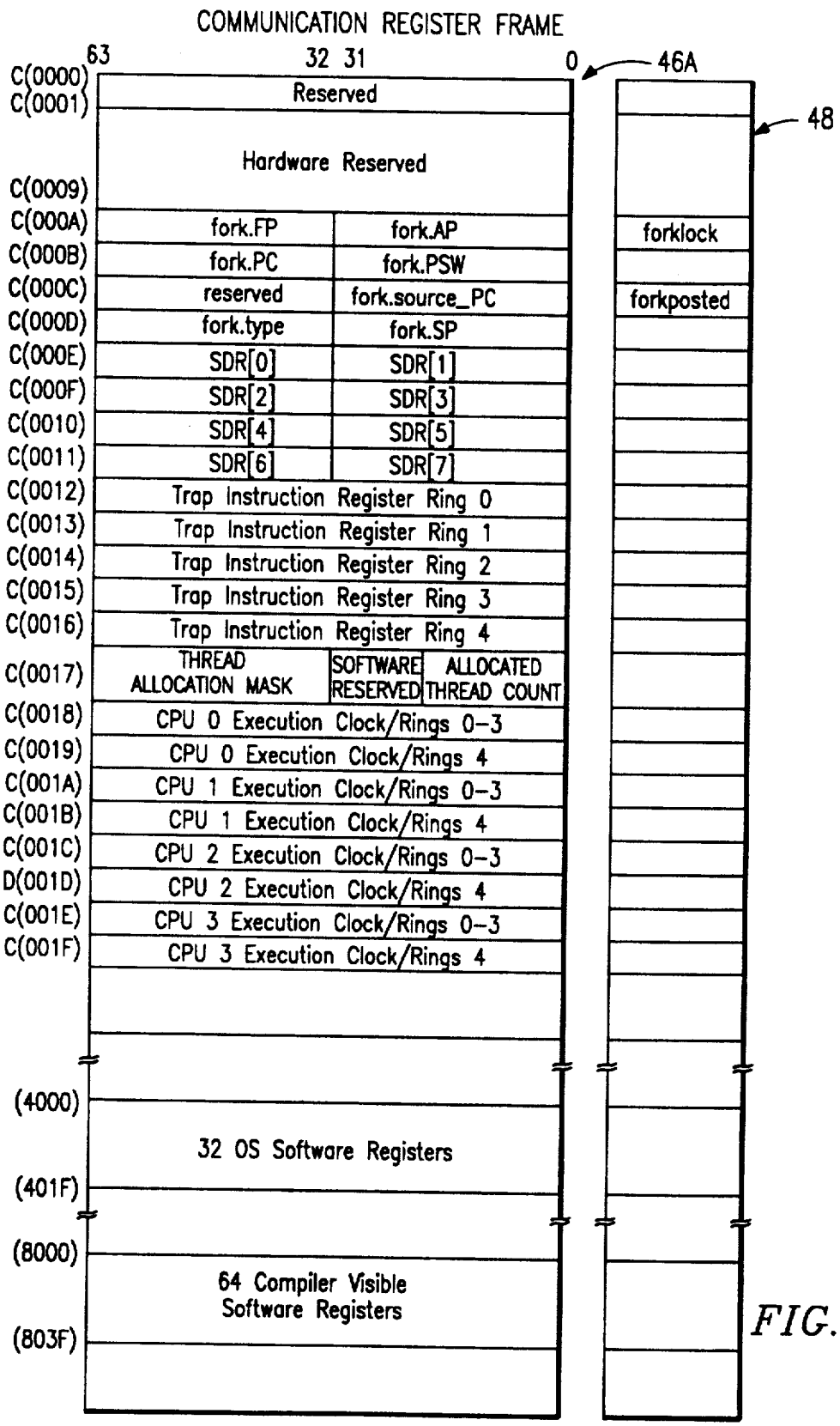
FIG. 3 is an illustration showing the microcode accessible contents of a communication register frame.

In the computer system 20, any of the processors, such as 24 and 26, can access the main memory independently. For conventional multi-processing, separate processes (programs) can run independently in the processors, such as 24 and 26, while accessing the main memory. Likewise, a single process can be executed by use of multiple threads, as further described below by use of the communication registers 46 and semaphores 48. Briefly, when a process is to be executed that includes both serial and parallel components, it is initially executed by any one of the processors, such as, for example, processor 24. When the process is begun, one of the communication register frames, for example, 46A, is allocated by the operating system to the process. An initial set of process state information, as further described in reference to FIG. 3, is written into the registers of frame 46A by the processor 24 through execution of the operating system which then causes the processor to begin execution of the selected process. While processor 24 is executing the selected process, the other processors in the system may be executing other processes or may be idle. When the processor 24 encounters a parallelization instruction, which is further described below, it performs a sequence of operations to inform the other processors that parallel execution is possible. First, it locks the "fork block," which comprises communication registers 000A-000D by executing a send to register 000A. (See FIG. 3). Setting this semaphore, which is referred to as the "forklock" semaphore, informs the other processors in the system that the fork block group of registers is being modified. Processor 24 then writes additional process state information into the fork block, and terminates by setting the semaphore associated with register 000D, the "forkposted" semaphore. The combination of forklock set and forkposted set signals the other processors that parallel execution is possible.

While the selected process is being executed in the processor 24, any of the other processors which are not executing processes, are in an idle state. While in the idle state, each of these processors increments an address register to sequentially examine particular semaphore registers within the communication registers 46. The idle processors continuously search for semaphores which are set to indicate that there are parallel operations available for execution. When an idle processor, for example, processor 26, detects that a semaphore has been set within the frame 46A to indicate that parallel operations are available, the processor 26 reads the process state information from frame 46A and based upon this process state information begins executing a parallel thread, as defined above, for the process. Access to process state information permits the processor 26 to immediately begin executing process instructions through access with the main memory 22. In most cases, the processor 24 will have executed a first of the parallel threads for the selected process. After threads have been initiated by the processors 24 and 26, any other processors which are idle may also pick up additional threads for execution. At the end of a thread execution, the processor which is executing the thread will encounter a "join" instruction. Each processor which executes the join will replace a flag in a thread allocation mask, (described below) and decrement an allocated thread count (described below). Both of these parameters are in location 0017 of the communication register set 46A. The last processor to execute a join instruction will recognize it as the last join instruction because the thread count is one, and this processor will continue serial execution of the process. Note that this last processor could be any of the processors in the system, not necessarily the one which originally posted the spawn. Should this last processor encounter a further parallelization instruction, the above-described process is repeated. Note that if none of the processors are idle, then the processor 24 will execute each of the threads sequentially for the selected process. Thus, the computer system of the present invention executes parallel operations on an invitation, rather than on a demand basis.

A more detailed description for the operation of the present invention, and its architecture is provided below.

Figure 2:
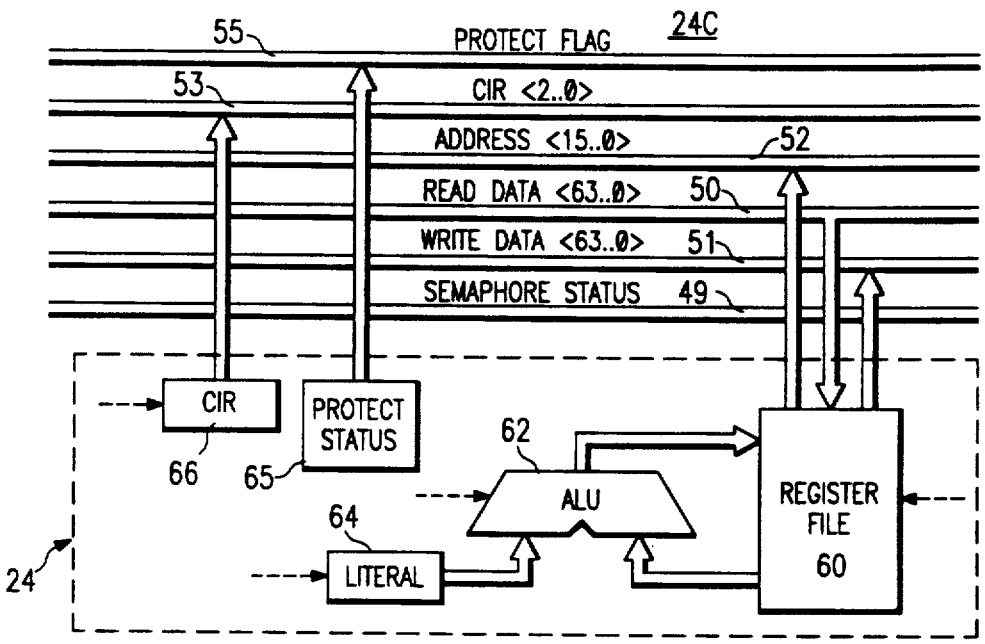
FIG. 2 is a block diagram showing detailed circuitry for the memory/communication register control illustrated in FIG. 1.

Referring now to FIG. 2, there is illustrated a schematic diagram for the memory/communication register control 24 shown in FIG. 1. This control operates in conjunction with the vector and scalar processor units 24A and 24B to generate addresses and transfer data to and from both the communication registers 46 and the main memory 22. The vector processing unit 24A and scalar processing unit 24B execute macro instructions through the use of microcode, which is itself decoded, to command the operations with various logic units and registers in the processor. This command operation is conventional in the industry.

Within the control 24C, there is provided a register file which is connected to transfer data and addresses between the processor 24 and the communication register busses 50, 51 and 52. There is further provided an ALU 62 which can perform address arithmetic as required by the process instructions. The register file 60 receives control commands from decoded microinstructions which are produced by the processing units 24A and 24B. The particular control lines are not shown, but are well understood in the industry. The control 24 further includes a literal register 64, which receives address information from process instructions. The literal register 64 is connected to provide a second input to the ALU 62.

The output from the ALU 62 is a 16 bit address segment which is generated by the instructions for a selected process, which is being executed by a processor. This address segment is produced strictly by the process software. This address segment is stored after generation, in the register file 60, before being transmitted to the address bus 52.

The control 24 further includes a communication index register 66, which stores a communication register index value therein. The register 66 is independent of the process software, that is, it cannot be set or read by any of the process instructions. The register 66 functions entirely in response to microinstructions which are executed by a processor when it is in the idle mode. This microcode operation is further described in reference to FIG. 4. When a processor, such as processor 24, is in an idle mode, it repeatedly executes a sequence of operations known as the idle loop. One of the operations performed in this idle loop is to scan the forkposted semaphores (see FIG. 3) of the various communication register sets, looking for a parallel segment in which it can join in the execution. It performs this scanning through the use of a designated set of addresses available to the microcode, but not to user programs. The processor asserts its right to use these designated addresses by transmitting the contents of its protect status flag register 65 via protect status bus 55 to the checker circuit 57. This status flag is in one status state when a user process is executing in a processor and is in another state when the operating system or idle loop is executing in the processor.

The outputs of the communication index register 66, the communication register address bus 52, and the protect status flag circuit 65 are driven to the communication register address mapper/checker circuit 57. The circuit 57 examines the received address to ensure that it addresses communication registers which are physically present and which the protect status flag allows to be accessed. User programs are not allowed access to the registers used by microcode and the operating system. Circuit 57 also concatenates selected one of the address bits with the communication address register 66 address bits to generate a 10-bit composite address for addressing a selected communication register. Circuit 57 combines a first address, process independent, segment from the register 66 which a second address segment, process dependent, from the ALU 62 to produce a composite address for addressing one register in the register 46.

Referring now to FIG. 3, there is shown in detail the information that is stored in one frame within the communication registers 64. In the present embodiment, the frame 46A comprises 128 64 bit registers. The frame 46 includes process state information which is set up by an ongoing process and permits another processor to pick up and execute, in parallel, a process operation which is defined by the process state stored in the frame.

The specific information stored in a communication register frame, such as 46A is as follows:

(1) Locations 000A–000D are the "Fork Block". They contain information generated by a processor executing a parallelization instruction to allow other processors to execute a parallel code segment of the executing process.

(2) Locations 000E–0011 contain the Segment Descriptor Registers (SDR's). They form the uppermost level of the process memory mapping tree, and are required for both serial and parallel execution.

(3) Locations 0012–0016 contain Trap Instruction Registers, which are special bit flags for debugging programs running on multiple processors.

(4) Location 0017 contains thread allocation control information. The thread allocation mask contains a bit for each possible physical thread in the process. The allocated thread count describes the number of threads currently in execution. A processor allocating itself clears a bit in the thread mask and increments the thread count. It does the reverse during de-allocation.

(5) Locations 0018–001F contain clock values which monitor the execution time on each CPU of the process running out of this communication register set. This information is used for accounting purposes.

(6) Locations 4000–401F are reserved for operating system usage.

(7) Locations 8000–803F are reserved for user process usage. Allocation of these registers is automatically performed by the compiler for typical process.

All of the registers are initialized during process creation by the operating system. Subsequently, numbers 1, 3, 4, 5 and 6 above are manipulated by the operating system and microcode during execution of the process. Item 7 is controlled directly by the user process.

When a process is in execution in a processor and a parallelization instruction is encountered, the execution of the parallelization instruction causes additional state information to be written into the corresponding communication register frame. The information which is written into the frame by a parallelization instruction is termed "fork block" information. Information contained within the fork block, which is written by a processor that invites other processors to join in parallel execution of a code segment, is as follows:

fork.FP—The initial frame pointer to be used by the new thread.

fork.AP—The initial argument pointer to be used by the new thread.

fork.PC—The address of the first instruction to be executed by the new thread.

fork.PSW—The initial program status word to be used by the new thread.

fork.source_PC—The address of the instruction which posted the fork or spawn request.

fork.type—This defines whether a fork or spawn instruction created the new thread. (A fork instruction invites only one processor to join in parallel execution, but a spawn invites more than one processor to join in parallel operation.)

fork.SP—The initial stack pointer of the new thread.

In addition, the semaphore associated with the fork.FP is used as the "forklock" flag, and the semaphore associated with fork.SP is used as the "forkposted" flag. When the forklock flag is set, it indicates that either a fork is being posted or taken by a processor, and no other processor should access the fork block until it is cleared. When the forkposted flag is set, it indicates that a valid fork is posted, and an idle processor is invited to take the fork.

When an idle processor has detected that a semaphore has been set and that parallel operations are available, all of the information necessary to begin execution of that operation is present in a frame of the communication register as described above and in reference to FIG. 3.

Figure 4:
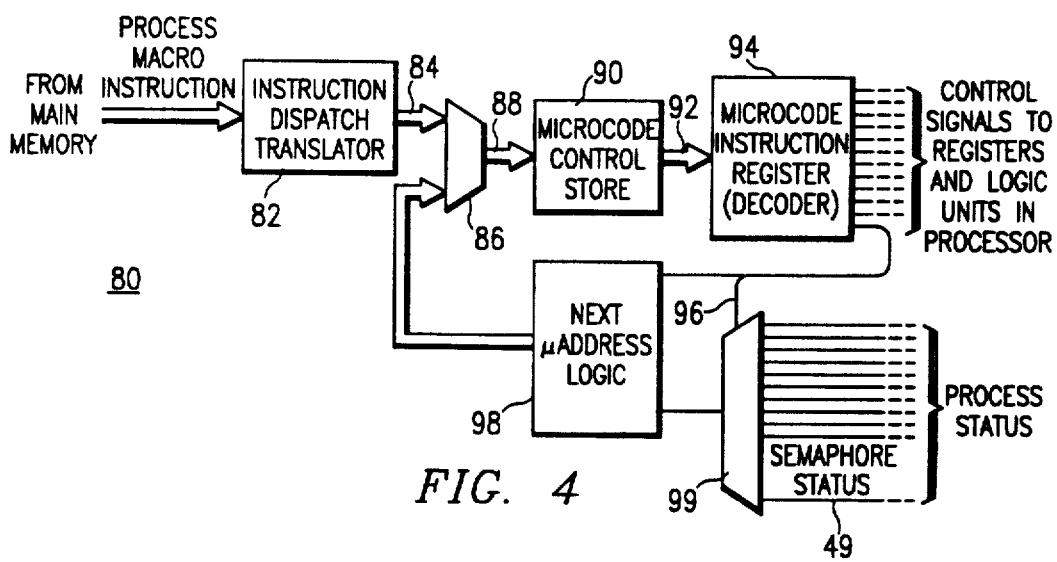
FIG. 4 is a block diagram illustrating microcode operation within a processor.

Referring now to FIG. 4, there is shown a microcode system 80 for use in the processors of the present invention. The system 80 is implemented within each of the scalar processing units for each of the processors, such as 24 and 26. Process macroinstructions are derived from main memory and supplied to an instruction dispatch translator 82. The translator produces a first microinstruction address for each macroinstruction through a line 84 to a first input of a multiplexer 86. The first microinstruction address is then provided through a line 88 to a microcode control store 90. The first microinstruction is then passed through a line 92 to a microcode instruction register 94, which also functions as a decoder. When a microcode instruction is decoded, there are produced control signals which are directed to registers and other logic units within the processor. Various representative control line signals are shown by dashed lines in FIGS. 2 and 4.

After the first microinstruction is transmitted from the table 82 and decoded in the register 94, subsequent microinstructions are issued by the microcode control store 90 to complete the execution of the corresponding macroinstruction. Next microcode address and modifiers are produced by the register 94 and transmitted through a line 96 to a next address logic circuit 98. Line 96 is also connected to a multiplexer 99 which receives various process status information from a plurality of lines, including line 49 which is the semaphore status from the communication registers. This status can be sensed during communication register accesses to cause the microcode to conditionally branch depending on semaphore state. This allows, for example, the microcode in the processor's idle loop to determine whether or not a fork semaphore has been posted to invite other processors to join in execution of a parallel process segment.

As noted above, when any one of the processors in the system 20, such as processor 24 or 26, is not executing a process, that processor is set in an idle mode which causes the execution of a microcode idle loop. As one step in this microcode loop, the communication index register 66 is incremented by one unit during each loop through a control signal from register 94 to communication index register 66. The register 66, in a selected embodiment, has three bits which provide an addressing capability for the eight frames 46A-46H. 16 address bits select a particular register in the selected frame during normal process execution, but in addition, a special range of addresses are available to the microcode which allow it to access any of the addresses in any of the frames. Thus, the idle mode operation entails continually scanning the "forkposted" semaphore in each of the frames in search of a set semaphore. If such a semaphore is detected, the corresponding communication index register (CIR) value is maintained in CIR register 66. The processor then proceeds to use the process state information stored in the selected frame to begin initiation of a process thread. During the execution of the process, various address information for the communication registers is generated by the process, but this comprises only the 16 address bits which define a register location within a frame, but it does not define which of the frames should be addressed. The address information for the particular frame is defined by the address segment which is retained within the communication index register 66. Thus, the process operates independently of, and with no knowledge of, the particular frame which has the process state information. The identification of the particular frame is done entirely independent of the process instructions. The process execution is further independent of the particular processor in which the process is being executed.

The present invention requires the use of parallelization instructions which are included within the object code that is executed by the processors. In Appendix I, there is presented a source code listing in FORTRAN for a process which performs matrix multiplication. Prior to the multiplication, the program instructions clear a memory area. Both the multiplication and the clearing operations involve "do" loops which is a particular type of instruction most readily subject to parallelization.

When the source code shown in Appendix I is compiled, there is produced an object code listing which is shown in Appendix II. Under the section labeled INSTRUCTIONS, at approximately the 13th line down, there is an instruction entitled "spawn." This is a parallelization instruction. The spawn instruction does not correspond to a particular source language statement, but rather results from analysis by the compiler of possible data dependencies of the various iterations which will be executed by the loop which is terminated by the continue statement at source label 10. This particular spawn has a maximum logical thread count of 100, since all of the iterations of loop 10 can be done in parallel. As previously discussed, the maximum physical thread count will be set by the operating system at run-time, as a function of predetermined allocation parameters.

Prior to the execution of each iteration of a parallel operation, a participating processor will access a particular communication register (here register 8000), and determine whether or not another iteration remains to be performed. If no more iterations exist, then the processor will branch to, and execute, the join instruction following label L6. During the execution of the join instruction, the processor will determine whether or not it is the last processor to complete its thread. If not, it will become idle, and commence searching for a parallel process in which to join for execution. If it is the last processor executing a parallel thread, it will commence execution of the serial thread following the join.

Note that, as in our example, the code may immediately begin another parallel segment, and spawn again to allow parallel execution.

As a result of this spawn instruction, a semaphore register is set to invite parallel execution of the do loop by any available processors. The parameters for the parallel execution are loaded into the communication register frame shown in FIG. 3. This particular "spawn" instruction is terminated by a "join" instruction approximately 13 lines later. Each processor which takes a thread for execution performs the processing operations required and then encounters the join instruction. This "join" instruction causes the processor to examine whether or not it is executing the last thread. If it is not, then it falls into the idle state, looking for another parallel process to execute. If it is the last, then it commences execution of the serial thread following the join.

Likewise, just preceding the line labeled "L7", there is a further "spawn" instruction which indicates that the operations in the source statement labeled "20" may be executed in parallel. This spawn instruction is terminated by a "join" instruction near the end of the listing.

Figure 5:
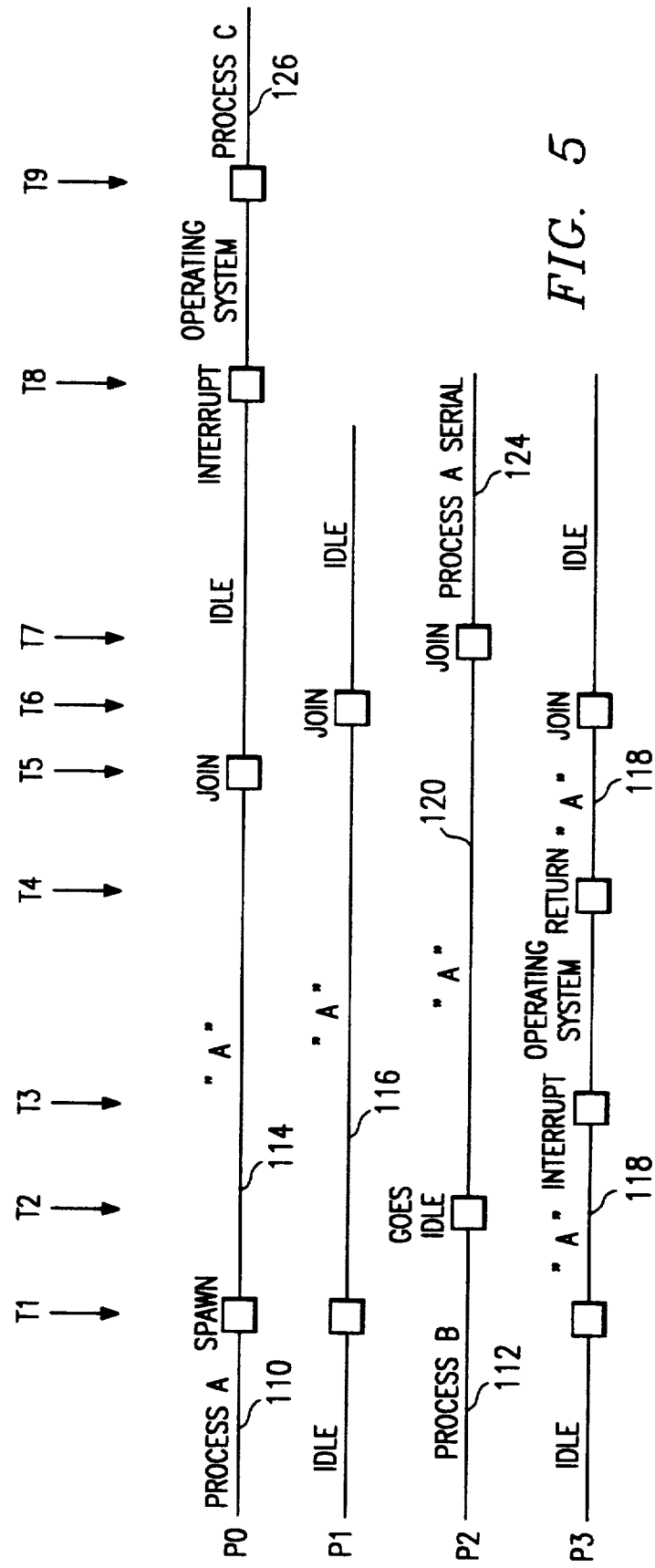
FIG. 5 is a time scale illustration showing processor utilization for executing a single process wherein the process is initially executed in serial fashion on a single processor and then spawned for parallel execution on multiple processors then returned for continued serial execution on a single processor.

Operation of the present invention is now further described in reference to the FIGURES, and in particular to FIG. 5. FIG. 5 also illustrates the thread concept of process execution. As shown in this figure, a process A is serially executed as a single thread 110 by processor P0. Processors P1 and P3 are idle. A process B is in execution by processor P2. At time T1, processor P0 executes a spawn instruction in process A. The process state information for parallel execution of the code in process A is written to a corresponding communication register set. Idle processors P1 and P3 detect the semaphore which has been set in the communication register set and take threads 116 and 118 for execution. Processor P1 takes thread 114 for execution and, until T2, processors P0, P1 and P3 execute code in parallel for process A.

At time T2 processor P2 completes process B and goes idle. Processor P2 then accepts thread 120 of process A and becomes the fourth processor to be executing process A concurrently.

At time T3 processor P3 receives an interrupt and begins to execute the operating system. This continues until time T4 when processor P3 returns to execution of thread 118.

Processor P0 completes execution of thread 114 at time T5 and executes a join instruction. Since other processors are still executing threads of process A, processor P0 goes idle.

Processors P1 and P3 complete execution of threads 116 and 118 at time T6 and go idle since processor P2 is still executing thread 120 of process A.

At time T7 processor P2 completes execution of thread 120 and executes a join instruction. Since no other processors are still executing any part of process A, processor P2 begins serial execution of process A with thread 124.

An interrupt occurs at time T8 for processor P0 to cause this processor to begin executing the operating system. At time T4, the processor P0 begins execution of new program C with thread 126.

As can be seen from the above description, a single process can be executed on one or more processors and after a spawn, the original process can be continued on a different processor. The process itself does not know which processor is executing the process or how many processors are executing the process. This method of operation provides substantial flexibility for the computer system and enhanced utilization of the multiple processor.

Although one embodiment of the invention has been illustrated in the accompanying Drawings and described in the foregoing Detailed Description, it will be understood that the invention is not limited to the embodiment disclosed, but is capable of numerous rearrangements, modifications and substitutions without departing from the scope of the invention.

APPENDIX I

```
c
c
c
C    TEST 101 - LOOP INTERCHANGE: MATRIX MULTI-
     PLY.
     dimension a(100,100),b(100,100),c(100,100)
c    data a/1,2,3,4,5,6,7,8,9,10,11,12,13,14,15,16/
c    data b/11,12,13,14,15,16,17,18,19,20,21,22,23,24,25,26/
     data n/100/
     do 10 i = 1,n
     do 10 j = 1,n
10   c(i,j) = 0
     do 20 i = 1,n
     do 20 j = 1,n
     do 20 k = 1,n
20   c(i,j) = c(i,j)+a(i,k)*b(k,j)
c    sl = sum (c, 16)
c    call check (101, sl.eq.10384)
     end
```

APPENDIX II

```
        .fpmode  native
; INITIALIZED DATA
        .data
        .align   8
L1:
        .ds.w    (1(0×0000064)
; UNINITIALIZED DATA
        .bss
        .align   8
LU:
        bs.b     40000 ; +0, A
        bs.b     40000 ; +40000, B
        bs.b     4 ; +120000, I
        bs.b     4 ; +120004, J
        bs.b     4 ; +120008, K
        .ubss
```

APPENDIX II —continued

```
        .ubss
        .align   8
LUU:
        bs.b     4 ; +0×0, ?i8
        .=.+4
        bs.b     4 ; +0×9, ?i9
; INSTRUCTIONS
        .text
        ds.w     0×0
        ds.b     "-03
0"
        .globl   __MAIN__  ;ENTRY
__MAIN__:
        sub.w    #Lfsl,sp              ; #9
        mov      psw,a5  ; #9
        and      #0×efffffff,a5        ; #9, -268435457
        mov      a5,psw  ; #9
        and      #0×fffffff8,sp        ; #9, -8
L2:
        ld.w     #0×ffffce0,s0         ; #9, -800
        snd.1    s0,0×80000            ; #9
        spawn    L3,sp
L3:              ; #9
; LOOP AT 9
L4:
        ld.w     #0×0000190,a5         ; #11, 400
L5:     inc.w    0×80000,a5
        jbra.f   L5   ; #11
        ld.w     #0×0000000,s0         ; #11, 0
        ld.w     #0×0000064,v1         ; #9
        le.w     #0×0009ab0,a5         ; #11, 39600
        jbra.t   L6                    ; #11 ld.w     #0×0000004,vs         ; #11
        ste.w    s0,LU+80400(a5)       ; #11, C
        jbr      L4                    ; #11
L6:
        join                           ; #11
        ulk      0×8000 ; #11
        ld.w     #0×ffffce0,s0         ; #12, -800
        snd.1    s0,0×8001             ; #12
        spawn    L7,sp
L7:              ; #12
; LOOP AT 12
L8:
        ld.w     #0×0000190,s0         ; #15, ACCESS
L9:     inc.1    0×8001,s0
        jbrs.f   L9   ; #14
        mov      s0,a1   ; #15,        ?ib
        le.w     #0×0009ab0,s0         ; #14, 39600
        jbrs.t   La                    ; #14 ld.w     #0×ffffe70,s1         ; #15, ?ia
        mov      s0,a2   ; #14,        ?cc
        mov      s1,ap   ; #15,        ?ia
; LOOP AT 14
Lb:
        ld.w     #0×0000004,vs         ; #15
        ld.w     #0×0000064,v1         ; #12
        ld.w     #0×0000064,v1         ; #12
        ld.w     LU+80400(a2),v0       ; #15, C
Lc:
        ld.w     LU+40400(a1),s0       ; #15, B
        add.w    #0×0000004,a1         ; #15, ?ib
        ld.w     LU+400(ap),v1         ; #15, A
        mul.s    v1,s0,v2              ; #15
        add.w    #0×0000190,ap         ; #15, ?ia
        add.s    v0,v2,v0              ; #15
        le.w     #0×0009ab0,ap         ; #15, 39600
        jbra.f   Lc                    ; #15 ld.w     #0×0000064,v1         ; #12
        st.w     v0,LU+80400(a2)       ; #15, C
        jbr      L8                    ; #15
;
La:
        join                           ; #15
        ulk      0×8001 ; #15
        rtn                            ; #18
```

-continued

APPENDIX II

Lfsl = 96

What we claim is:

1. A computer system having multiple processors for parallel execution of a process, comprising:

a plurality of communication register sets, each set comprising a plurality of communication registers, at least one respective semaphore register associated with one register in each of said communication register sets, a respective communication index register associated with each of said processors, each of said communication index registers for storing a process-independent communication index register value therein which comprises a first address segment and serves to address one of said communication register sets, wherein said communication index register values are not set or read by instructions in said process, a respective logic circuit associated with each of said processors for producing a second address segment which is derived form the execution of instructions in said process, wherein said second address segment serves as an address for one of the registers in each of said communication register sets, bus circuits connected to said communication registers, said semaphore registers, said communication index registers and said logic circuits for conveying addresses and data associated with said communication registers and said semaphore registers, an address circuit connected via one or more of said bus circuits to said communication index registers and said logic circuits for receiving said first and second address segments and producing therefrom a composite address which corresponds to one of the registers within one of said communication register sets, wherein a first of said processors when encountering a parallelization instruction during execution of said process communicates via one or more of said bus circuits with a selected one of said communication register sets by use of at least said process-independent first address segment to store process state information therein and to set a state of the associated semaphore register, and a second of said processors is connected via one or more of said bus circuits to communicate with said selected one communication register set by use of at least said process-independent first address segment to scan the state of the associated semaphore register and to read said process state information therefrom when the semaphore register is set so that said first and second processors can execute said process in parallel.

2. A computer system having multiple processors as recited in claim 1 wherein said logic circuit comprises an arithmetic logic unit which responds to said process instructions to generate said second address segment therefrom.

3. A computer system having multiple processors for parallel execution of a process, comprising:

a plurality of communication register sets, each set comprising a plurality of communication registers, at least one respective semaphore register associated with one register in each of said communication register sets, a respective communication index register associated with each of said processors, each of said communication index registers for storing a process-independent communication index register value therein which comprises a first address segment and serves to address one of said communication register sets, wherein said communication index register values are not set or read by instructions in said process, a respective logic circuit associated with each of said processors for producing a second address segment which is derived form the execution of instructions in said process, wherein said second address segment serves as an address for one of the registers in each of said communication register sets, bus circuits connected to said communication registers, said semaphore registers, said communication index registers and said logic circuits for conveying addresses and data associated with said communication registers and said semaphore registers, an address circuit connected via one or more of said bus circuits to said communication index registers and said logic circuits for receiving said first and second address segments and producing therefrom a composite address which corresponds to one of the registers within one of said communication register sets, wherein a first of said processors when encountering a parallelization instruction during execution of said process communicates via one or more of said bus circuits with a selected one of said communication register sets by use of at least said process-independent first address segment to store process state information therein and to set a state of the associated semaphore register, and a respective microcode operation circuit associated with each of said processors, said microcode operation circuit connected to the communication index register for the corresponding processor to periodically increment the value stored therein when the corresponding processor is in an idle state, and said microcode operation circuit is further connected to read said semaphore registers by use of at least said first address segment, and a second of said processors is connected via one of more of said bus circuits to communicate with said selected one communication register set by use of at least said process-independent first address segment to scan the state of the associated semaphore register and to read said processor state information therefrom when the semaphore register is set so that said first and second processors can execute said process in parallel.

4. A computer system having multiple processors as recited in claim 3 including at least a second semaphore register associated with each of said communication register sets and connected via one or more of said bus circuits so that said second semaphore register can be set by one of said processors to prevent access to the corresponding communication register set by other of said processors.

5. A computer system having multiple processors as recited in claim 3 wherein said logic circuit comprises an arithmetic logic unit which responds to said process instructions to generate said second address segment therefrom.

* * * * *

UNITED STATES PATENT AND TRADEMARK OFFICE
CERTIFICATE OF CORRECTION

PATENT NO. : 5,159,686

DATED : October 27, 1992

INVENTOR(S) : Chastain et al.

It is certified that error appears in the above-identified patent and that said Letters Patent is hereby corrected as shown below:

Col. 12, approximately Line 11, please delete "ds.b "-03" and substitute therefor -- "ds.b -03\0" --.

Col. 12, approximately Line 12, please delete "0"".

Col. 13, Line 27, please delete "form" and substitute therefor -- from --.

Col. 14, Line 15, please delete "form" and substitute therefor -- from --.

Col. 14, Line 47, please delete "one of" and substitute therefor -- one or --.

Col. 14, Line 52, please delete "processor" and substitute therefor -- process --.

Signed and Sealed this

Twelfth Day of October, 1993

*Attest:*

BRUCE LEHMAN

*Attesting Officer*    *Commissioner of Patents and Trademarks*